(12) United States Patent
Kirkham et al.

(10) Patent No.: US 9,424,491 B1
(45) Date of Patent: Aug. 23, 2016

(54) SUGGESTING PROFILE IMAGES FOR A SOCIAL NETWORK

(71) Applicant: Google Inc., Mountain View, CA (US)

(72) Inventors: Stephen Kirkham, San Francisco, CA (US); Brandon Bilinski, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/512,978

(22) Filed: Oct. 13, 2014

Related U.S. Application Data

(63) Continuation of application No. 13/253,693, filed on Oct. 5, 2011, now Pat. No. 8,867,849.

(51) Int. Cl.
*G06K 9/62* (2006.01)

(52) U.S. Cl.
CPC ............ *G06K 9/6267* (2013.01); *G06K 9/6201* (2013.01)

(58) Field of Classification Search
None
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,697,478 B1 | 2/2004 | Meldrum et al. | |
| 6,754,322 B1 | 6/2004 | Bushnell | |
| 7,035,467 B2 * | 4/2006 | Nicponski | 382/224 |
| 7,106,848 B1 | 9/2006 | Barlow et al. | |
| 7,366,990 B2 | 4/2008 | Pitroda | |
| 7,515,294 B2 * | 4/2009 | Yamazoe et al. | 358/1.18 |
| 7,555,110 B2 | 6/2009 | Dolan et al. | |
| 7,610,287 B1 | 10/2009 | Dean et al. | |
| 7,742,468 B2 | 6/2010 | Vagelos | |
| 8,571,331 B2 * | 10/2013 | Cifarelli | 382/224 |
| 2002/0137490 A1 | 9/2002 | Gallant | |
| 2002/0143874 A1 | 10/2002 | Marquette et al. | |
| 2002/0154147 A1 * | 10/2002 | Battles | 345/660 |
| 2004/0258220 A1 | 12/2004 | Levine et al. | |
| 2004/0264810 A1 * | 12/2004 | Taugher et al. | 382/305 |
| 2005/0152521 A1 | 7/2005 | Liljestrand | |
| 2006/0026288 A1 | 2/2006 | Acharya et al. | |
| 2006/0077957 A1 | 4/2006 | Reddy et al. | |
| 2006/0206604 A1 | 9/2006 | O'Neil et al. | |
| 2007/0127631 A1 | 6/2007 | Difiglia | |
| 2007/0171898 A1 | 7/2007 | Salva | |

(Continued)

FOREIGN PATENT DOCUMENTS

WO     WO0279984     10/2002

OTHER PUBLICATIONS

Autotagging Facebook: Social Network Context Improves Photo Annotation, by Stone et al., IEEE document, Aug. 2008.*

(Continued)

*Primary Examiner* — Vikkram Bali
(74) *Attorney, Agent, or Firm* — Patent Law Works LLP

(57) ABSTRACT

A system and method for generating an ordered set of suggested profile images. The profile image application includes a scorer, a recognition engine, a trend analyzer, a suggestion module and a user interface engine. The scorer scores user images based on metadata, such as the number of people tagged in the image and the recency of the image. The recognition engine identifies people and objects in the image. The trend analyzer identifies trends. The suggestion module generates the ordered set of suggested profile images based at least in part on the score. The user interface engine generates a user interface that includes the ordered set of suggested profile images.

20 Claims, 6 Drawing Sheets

(56) References Cited

U.S. PATENT DOCUMENTS

| | | | |
|---|---|---|---|
| 2007/0173236 | A1 | 7/2007 | Vishwanathan et al. |
| 2007/0248077 | A1 | 10/2007 | Mahle, Jr. et al. |
| 2008/0056475 | A1 | 3/2008 | Brannick et al. |
| 2008/0192656 | A1 | 8/2008 | Vagelos |
| 2008/0276177 | A1* | 11/2008 | Sauve ............................ 715/733 |
| 2008/0282174 | A1* | 11/2008 | Sauve et al. ................... 715/748 |
| 2009/0074261 | A1* | 3/2009 | Haupt et al. ................... 382/118 |
| 2010/0179816 | A1* | 7/2010 | Wu et al. ........................ 705/1.1 |
| 2010/0217989 | A1* | 8/2010 | Sauve et al. ................... 713/175 |
| 2010/0251305 | A1* | 9/2010 | Kimble et al. ................... 725/46 |
| 2011/0072376 | A1* | 3/2011 | Moore et al. ................... 715/765 |
| 2011/0098156 | A1 | 4/2011 | Ng et al. |
| 2011/0205373 | A1 | 8/2011 | Wasula et al. |
| 2012/0060105 | A1* | 3/2012 | Brown et al. ................... 715/753 |
| 2012/0072428 | A1* | 3/2012 | Kao et al. ....................... 707/748 |

OTHER PUBLICATIONS

Adamic et al., "A Social Network Caught in the Web," Internet Journal, First Monday, Jun. 2, 2003, vol. 8, No. 6, pp. 1-22.

Agarwal et al., "Enabling Real-Time User Interests for Next Generation Activity-Oriented Social Networks," Thesis submitted to the Indian Istitute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 11, 2004, 22 pgs.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, May 2002 pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twigger, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

\* cited by examiner

SUGGESTING PROFILE IMAGES FOR A SOCIAL NETWORK

CROSS REFERENCE TO RELATED APPLICATIONS

This application is a continuation of and claims priority to U.S. application Ser. No. 13/253,693, filed Oct. 5, 2011, titled, "Suggesting Profile Images for a Social Network," which is incorporated herein by reference in its entirety.

BACKGROUND

The specification relates to generating a set of suggested profile images for a user. In particular, the specification relates to generating a set of suggested profile images for a user by identifying the most recent images of the user with the least number of people in the images.

Over the last decade social networking has become increasingly popular. The sharing of information among social network users has exponentially increased. Users post information such as text, photos, audio and videos on a daily basis. Users also tag people in the photos, sometimes to alert people to something interesting but also to identify the users in the images.

One way to personalize a user profile is to select a profile image. This process is frequently cumbersome because the user selects an image, uploads the image, resizes the image and makes other changes. Mobile device users find the process to be particularly difficult when using a small screen on the mobile device. Prior art methods attempt to overcome these difficulties by allowing a user to capture an image with a webcam, upload the image from the user's desktop, choose a photo from a camera roll or choose another user's photo as a profile image. These options, however, still require that the user go through several steps to select a profile image.

SUMMARY OF THE INVENTION

In some examples, the specification describes a system and method for generating a set of suggested profile images for a social network using a profile image application. The profile image application includes a scorer, a recognition engine, a trend analyzer and a suggestion module. The scorer identifies metadata associated with each application and scores a plurality of images based at least in part on the metadata. In one embodiment, the images are user-uploaded images or images from a third party application. In another embodiment, the metadata includes at least one of a tag of the user, a tag of other people and a timestamp. In yet another embodiment, the scoring includes generating a lower score for an image where the user and other people are tagged than an image where the user is tagged. In one embodiment, the scoring includes generating a higher score for more recent images based at least in part on the timestamp. In another embodiment, the scorer receives user feedback that includes a selection of at least one of the suggested profile images and adjusts the scoring to reflect user preference.

The recognition engine identifies people and objects in the image. In one embodiment, the recognition engine determines whether the image includes people that were not tagged. The trend analyzer identifies trends based at least in part on the people and objects identified by the recognition engine. The suggestion module generates the ordered set of suggested profile images based at least in part on the score and provides the suggested profile images to the user. This method is advantageous for mobile device users because it avoids the need for a user to go through the arduous steps of selecting a user image, resizing the image, selecting the user image as a profile image, etc.

In one embodiment, the specification includes a computer program product comprising a computer useable medium including a computer readable program, wherein the computer readable program when executed on a computer causes the computer to receive a plurality of images, identify metadata associated with each application, score the plurality of images based at least in part on the metadata, generate an ordered set of suggested profile images and provide the ordered set of suggested profile images.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
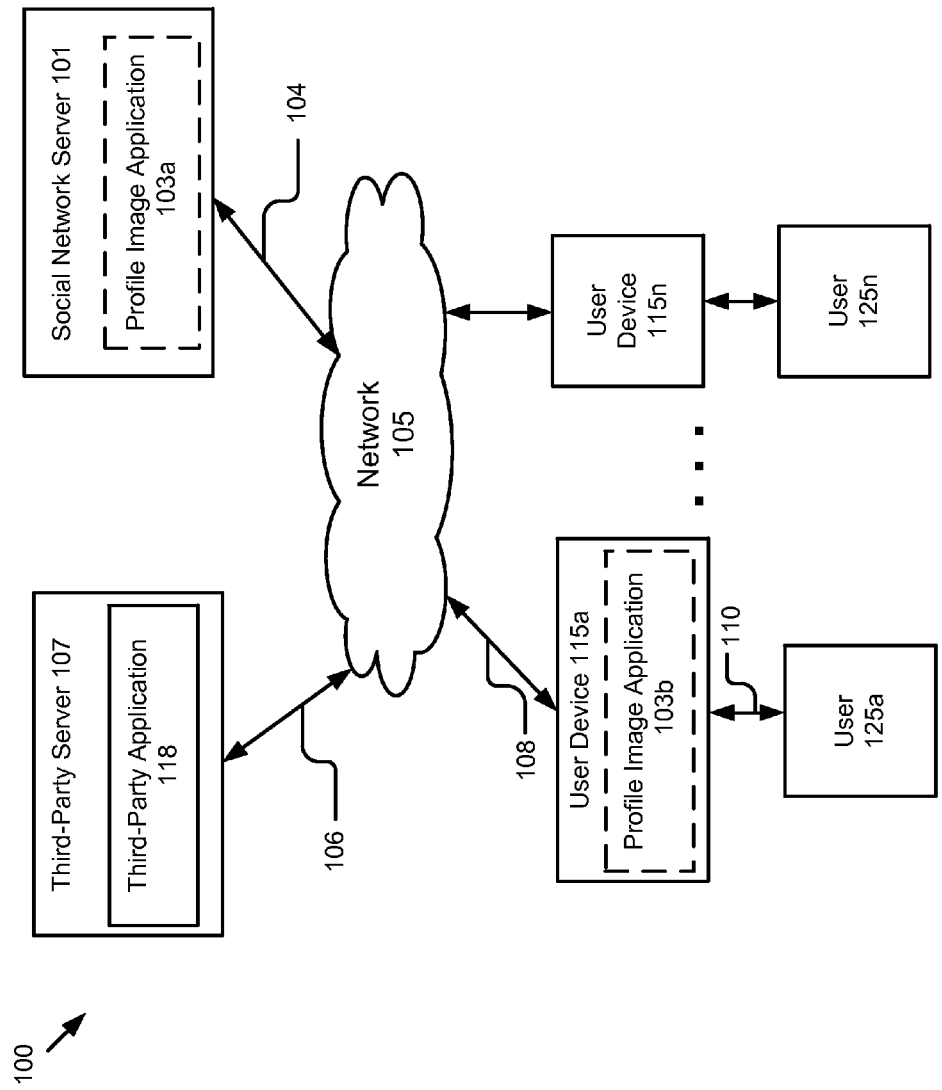
FIG. 1 is a block diagram illustrating one embodiment of a system for ordering a set of suggested profile images.

A system and method for suggesting a set of profile images are described below. In the following description, for purposes of explanation, numerous specific details are set forth in order to provide a thorough understanding of the specification. It will be apparent, however, to one skilled in the art that the invention can be practiced without these specific details. In other instances, structures and devices are shown in block diagram form in order to avoid obscuring the description. For example, the present embodiment is described in one embodiment below primarily with reference to user interfaces and particular hardware. However, the present embodiment applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

System Overview

FIG. 1 illustrates a block diagram of a system 100 for generating a set of suggested profile images according to some examples. The illustrated description of the system 100 includes user devices 115a, 115n that are accessed by users 125a, 125n, a social network server 101 and third-party server 107. In FIG. 1 and the remaining figures, a letter after a reference number, such as "115a" is a reference to the element having that particular reference number. A reference number in the text without a following letter, such as "115," is a general reference to any or all instances of the element bearing that reference number. In the illustrated embodiment, these entities are communicatively coupled via a network 105.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc. While only one network 105 is coupled to the user devices 115a, 115n, the social network server 101 and the third-party server 107, in practice any number of networks 105 can be connected to the entities.

In one embodiment, the profile image application 103a is operable on the social network server 101, which is coupled to the network via signal line 104. In one embodiment, the social network server 101 sends and receives data to and from one or more of the user devices 115a, 115n and the third-party server 107 via the network 105. For example, the social network server 101 is a hardware server operated by Google® of Mountain View, Calif. that provides the Google+ service to the user devices 115a, 115n. A person having ordinary skill in the art will recognize that the social network server 101 can be configured to provide different services and/or functionality to the user devices 115a, 115n. Although only one social network server 101 is shown, persons of ordinary skill in the art will recognize that multiple social network servers 101 may be present.

In another embodiment, the profile image application 103b is stored on the user device 115a, which is connected to the network via signal line 108. The user device 115a is any computing device that includes a memory and a processor, such as personal computer, a laptop, a tablet or a mobile device such as a cellular phone, a personal digital assistant or a smart phone, etc. The user 125a interacts with the user device 115a via signal line 110. Although only two user devices 115a, 115n are illustrated, persons of ordinary skill in the art will recognize that any number of user devices 115n are available to any number of users 125n.

The third-party server 107 is a hardware server device that includes a third-party application 118. In one embodiment, the third-party server 107 sends and receives data to and from one or more user devices 115a, 115n and the social network server 101 via the network 105. For example, the third-party server 107 is a hardware server that manages a photo application for uploading, modifying and transmitting images to the profile image application 103. A person with ordinary skill in the art will recognize that the third-party server 107 can be configured to provide different services and/or functionalities to the user devices 115a, 115n and the social network server 101. The third-party server 107 is connected to the network 105 via signal line 106. Although only one third-party server 107 and only one third-party application 118 are shown, persons of ordinary skill in the art will recognize that multiple third-party servers including multiple third-party applications may be present.

Profile Image Application 103

Figure 2:
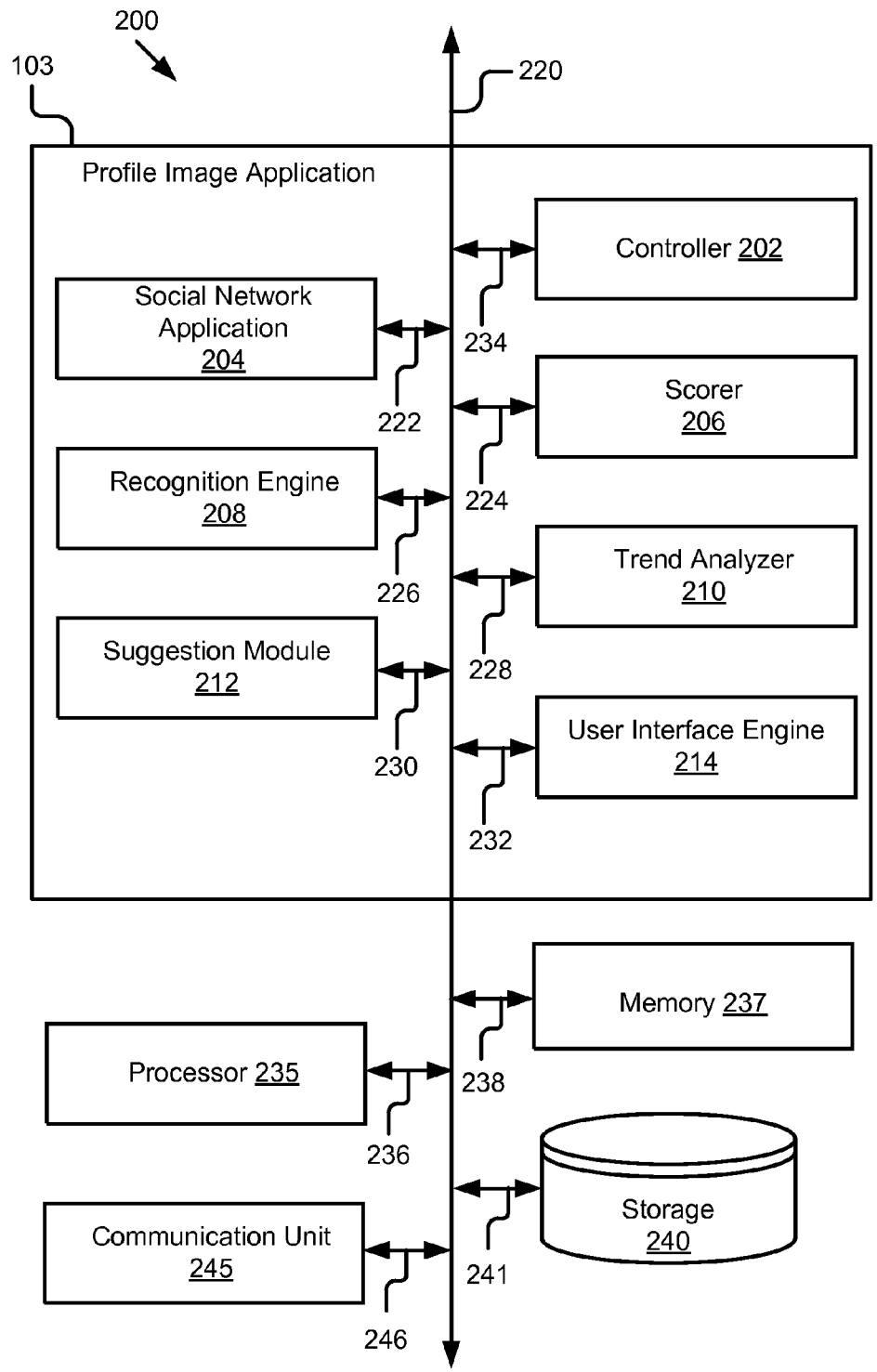
FIG. 2 is a block diagram illustrating one embodiment of a profile image application.

Referring now to FIG. 2, the profile image application 103 is shown in detail. FIG. 2 is a block diagram of a computing device 200 that includes the profile image application 103, a memory 237, storage 240, a communication unit 245 and a processor 235. In one embodiment, the computing 200 device is a social network server 101. In another embodiment, the computing device 200 is a user device 115a. While the modules are described for an embodiment where the profile image application 103a is stored on the social network server 101, persons of ordinary skill in the art will recognize that the descriptions can be modified to describe the application as being stored on the user device 115a.

The processor 235 comprises an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by processor 235. The memory 237 is coupled to the bus 220 for communication with the other components via signal line 238. The instructions and/or data may comprise code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The storage 240 is a non-transitory memory that stores data for the functionality of the profile image application 103. The storage 240 is coupled to the bus 220 via signal line 241. The data stored in the storage 240 includes user information such as a user profile for each user and social network content such as posts and images submitted by a user 125, media submitted by the user's friends, images received from a third-party application 118, etc. The social network content is explained in further detail below with reference to the social network application 202.

The communication unit 245 transmits and receives data to and from the user device 115, third-party server 107 and/or the social network server 101 depending upon where the profile image application 103 is stored. The communication unit 245 is coupled to the bus 220 via signal line 246. In one embodiment, the communication unit 245 includes a port for direct physical connection to the network 105 or to another communication channel. For example, the communication unit 245 includes a USB, SD, CAT-5 or similar port for wired communication with the user device 115. In another embodiment, the communication unit 245 includes a wireless transceiver for exchanging data with the user device 115, the third-party server 107 or any other communication channel using one or more wireless communication methods, such as IEEE 802.11, IEEE 802.16, BLUETOOTH® or another suitable wireless communication method.

In yet another embodiment, the communication unit 245 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 245 includes a wired port and a wireless transceiver. The communication unit 245 also provides other conventional connections to the network for distribution of files and/or media objects using standard network protocols such as TCP/IP, HTTP, HTTPS and SMTP as will be understood to those skilled in the art.

In one embodiment, the profile image application 103 comprises a controller 202, a social network application 204, a scorer 206, a recognition engine 208, a trend analyzer 210, a suggestion module 212 and a user interface engine 214 that are each coupled to the bus 220.

The controller 202 is software including routines for receiving information such as posts, media, requests for social network content, etc. via the communication unit 245 and transmitting the information to the other components of the profile image application 103. In one embodiment, the controller 202 is a set of instructions executable by the processor 235 to provide the functionality described below for receiving and transmitting information. In another embodiment, the controller 202 is stored in the memory 237 of the computing device 200 and is accessible and executable by the processor 235. In either embodiment, the controller 202 is adapted for cooperation and communication with the processor 235, the communication unit 245, the storage 240, the social network application 204, the scorer 206, the recognition engine 208, the trend analyzer 210, the suggestion module 212, the user interface engine 214 and other components of the computing device 200 via signal line 234.

The controller 202 receives social content submitted by a user 125 from a user device 115. The social content includes posts, comments and attached media. The attached media includes for example, images, video, audio, news articles, documents, website links, etc. In one embodiment, the images are tagged with a user's identity. The controller 202 transmits social content to the social network application 204 and also transmits any images to the scorer 206 or the recognition engine 208. The controller 202 also stores the received posts in the storage 240.

In another embodiment, the controller 202 receives images from a third-party server 107 via the communication unit 245. The images received from the third-party server 107 includes, for example, images submitted by the user 125 using a third-party application 118, images submitted by another person where the user is tagged in the image and publically available images. In one embodiment, the controller 202 receives the media by sending a request to the third-party server 107 via the communication unit 245. In another embodiment, the controller 202 receives the media from the third-party server 107 periodically, for example, every week, every day, every hour, etc. The controller 202 stores the received media in the storage 240. Once the suggestion module 210 generates a set of suggested profile images and the user interface engine 214 generates a user interface that includes the set of suggested profile images, the controller 202 transmits the set to the user 115*a* via the communication unit 245.

The social network application 204 is software including routines for generating and managing a social network. In one embodiment, the social network application 204 is a set of instructions executable by the processor 235 to provide the functionality described below for generating and managing a social network. In another embodiment, the social network application 204 is stored in the memory 237 of the computing device 200 and is accessible and executable by the processor 235. In either embodiment, the social network application 204 is adapted for cooperation and communication with the processor 235, the communication unit 245, the storage 240, the controller 202, the user interface engine 214 and other components of the computing device 200 via signal line 222.

A social network is any type of social structure where the users 125 are connected by a common feature, for example, Google+. The common feature includes friendship, family, work, an interest, etc. The common features are provided by one or more social networking systems, such as those included in the system 100, including explicitly-defined relationships and relationships implied by social connections with other online users, where the relationships form a social graph (not shown). In some examples, the social graph (not shown) reflects a mapping of these users 125 and how they are related.

The social network application 204 registers a user with the social network by receiving a username, password, demographic information, likes, dislikes, education, work history, impressive facts, nicknames, etc. from the user. The social network application 204 generates a unique identifier associated with the user, generates and updates a social graph of the user's relationship with other users and generates a user profile that incorporates the user information including the registration information and the unique identifier. The social network application 204 also updates the user profile, for example, in response to receive a user selection of a suggested profile image generated by the suggestion module 212. The user profile is stored in the storage 240. In one embodiment, the social network application 204 generates a user profile that includes information for accessing a third-party application, such as a photo-sharing website and the social network application 204 receives and manages images from the third-party application 118, such as images where the user is tagged.

In one embodiment the social network application 204 receives a request for social network content from the controller 202. The social network content includes, for example, a description of activities performed by the user 125 and the user's friends, conversations, events, etc. The social network application 204 transmits instructions to the user interface engine 214 to generate a user interface that displays the social network content. In a further embodiment, the social network application 202 also receives a post submitted by the user 125 from the controller 202 and instructs the user interface engine 214 to incorporate the post in the user interface displaying the social network content.

The scorer 206 is software including routines for receiving images from the controller 202 and scoring the images based on predetermined preferences. In one embodiment, the scorer 206 is a set of instructions executable by the processor 235 to provide the functionality described below for scoring images. In another embodiment, the scorer 206 is stored in the memory 237 of the computing device 200 and is accessible and executable by the processor 235. In either embodiment, the scorer 206 is adapted for cooperation and communication with the processor 235, the communication unit 245, the storage 240, the controller 202, the suggestion module 212 and other components of the computing device 200 via signal line 224.

In one embodiment, the scorer 206 identifies metadata associated with the image including the names of people that are tagged in the image and the date that the image was captured. The scorer 206 applies a score to images where the user is tagged and the score 206 applies a higher score to the images based on recency of the images. The tags are applied by the user or other people. In one embodiment, the scorer applies a higher score to images where the user identifies himself because these tags are more likely to be accurate and possibly more flattering. In another embodiment, the scorer 206 also selects images where the user and other people are tagged. These images receive a lower score than images where only the user is tagged.

In another embodiment, the scorer 206 receives trends from the trend analyzer 210 and user images from the recognition engine 208 that have been identified as containing an object identified as being part of the trend. The scorer 206 applies a score to the identified user images. In one embodiment, the trend analyzer 210 indicates a level of prevalence of the trend, which the scorer 206 uses to modify the score. For example, if 50% of the social network users change their profile to images of blocks to celebrate the invention of the first block, the scorer 206 applies a higher score to the image than if only 0.05% of the social network users change their profile to images of blocks.

In yet another embodiment, the scorer 206 also updates the scoring rules based on user feedback. For example, the suggestions module 212 presents different options to the user for profile images and the user consistently selects images with multiple people in them as profile images. As a result, the scorer 206 applies a higher score to images with multiple tagged people than images with only the user tagged. In another embodiment, the scorer 206 updates the scoring rules based on feedback from similar users (according to demographics) or all users of the social network.

The recognition engine 208 is software including routines for receiving images from the controller 202 and performing recognition on the images to recognize people and objects. In one embodiment, the recognition engine 208 is a set of instructions executable by the processor 235 to provide the functionality described below for recognizing images. In another embodiment, the recognition engine 208 is stored in the memory 237 of the computing device 200 and is accessible and executable by the processor 235. In either embodiment, the recognition engine 208 is adapted for cooperation and communication with the processor 235, the communication unit 245, the storage 240, the controller 202, the recognition engine 208 and other components of the computing device 200 via signal line 226.

In one embodiment the recognition engine 208 performs recognition on images received from the controller 202 to determine: (1) whether the user was accurately tagged; (2) whether the user and other people were not tagged in images when they should have been; and (3) whether the user's images contain an object or a person that is part of a social network trend.

In one embodiment, the recognition engine 208 determines whether the user was accurately tagged by determining whether the image contains a person or an object that was tagged as the user. In some instances, social network users will tag an image of something such as a building with a user's name to draw the tagged user's attention to the image. This is unhelpful for the process of selecting a profile image, so the recognition engine 208 will notify the scorer 206 to score improperly tagged images as zero. Methods for identifying objects in images include recognition by parts, appearance-based methods (e.g. edge matching, divide-and-conquer search, grayscale matching, gradient matching, large model-bases, etc.), and feature-based methods (e.g. interpretation trees, hypothesize and test, pose consistency, pose clustering, invariance, geometric hashing, scale-invariant feature transform (SIFT), speeded up robust features (SURF), etc.). Persons of ordinary skill in the art will recognize that other methods of object recognition can be performed by the recognition engine 208.

In another embodiment, the recognition engine 208 performs facial recognition of the images to confirm that the user is properly identified. In one embodiment, the recognition engine 208 measures the distance between distinct facial features, such as the eyes, nose and mouth in the image and compares the distance to distinct facial features in a verified image of the user and determines whether the differences are within an acceptable threshold, such as 5%. Persons of ordinary skill in the art will recognize that other methods of facial recognition can be performed by the recognition engine 208.

The recognition engine 208 determines whether the user and other people were not tagged in images when they should have been by detecting objects associated with faces in the image, such as eyes, a nose, a mouth, a head and a body. If the recognition engine 208 determines that there are untagged people in the image, the recognition engine 208 performs facial recognition. In one embodiment, the recognition engine 208 compares the facial measurements against a set of the user and other people that are part of the user's social graph. This reduces the number of comparisons that the recognition engine 208 makes and improves the accuracy because the image is more likely to involve the user and the user's friends than people outside of the social graph.

The recognition engine 208 determines whether the user's images contain an object or a person that is part of a social network trend by analyzing profile images and categorizing objects and people in the images to identify types of objects and people and analyzing the user's images to determine whether they contain the objects or the people. The analysis is transmitted to the trend analyzer 210 for determining a trend based on the objects. For example, the recognition engine 208 identifies the presence of a pink cancer ribbon or a cat in the profile images, receives a request from the trend analyzer 210 to search for pink cancer ribbons or a cat in the user's images and performs object recognition on the user's images.

In another embodiment, the recognition engine 208 identifies the presence of a person in profile images that is not the same as the user, for example because it is National Dad Appreciation Week or a celebrity recently passed away, and transmits the identity of the person to the trend analyzer 210. In one embodiment, the recognition engine 208 uses the social graph to determine that the person is related to the user, for example the person is the user's father, and the recognition engine 208 transmits the relationship to the trend analyzer as well. The recognition engine 208 receives an indication of a trend from the trend analyzer 210 and determines whether the user has images of the person identified as being part of the trend. If yes, the recognition engine 208 transmits the image to the scorer 206 for scoring.

The trend analyzer 210 is software including routines for receiving analysis from the recognition engine 208 and identifying trends in profile images. In one embodiment, the trend analyzer 210 is a set of instructions executable by the processor 235 to provide the functionality described below for analyzing trends. In another embodiment, the recognition engine 208 is stored in the memory 237 of the computing device 200 and is accessible and executable by the processor 235. In either embodiment, the trend analyzer 210 is adapted for cooperation and communication with the processor 235, the communication unit 245, the storage 240, the recognition engine 208, the suggestion module 212 and other components of the computing device 200 via signal line 228.

In one embodiment, the trend analyzer 210 receives a set of objects or people identified in all profile images and a timestamp that the images were captured. In another embodiment, the trend analyzer 210 receives profile images that were changed recently, such as in the last week to reduce the computations needed to be performed. The trend analyzer 210 applies an algorithm to determine whether the increase in a type of object or person is indicative of a trend. In one embodiment, the algorithm is a trend estimation, which is a statistical technique that generates a model and determines whether a change in the model is random or a trend. For example, if a non-random number of people have profile images of dog, it may be National Dog Appreciation Week. Persons of ordinary skill in the art will recognize that other statistical methods for detecting trends are possible. Once the trend analyzer 210 identifies a trend, the trend analyzer 210 notifies the recognition engine 208 of the trend so that the recognition engine 208 searches the user's images to identify an object or person associated with the trend if the user's images have not already been processed by the recognition engine 208. If the recognition engine 208 processed the user's images, the trend analyzer 210 transmits the trend to the scorer 206 so that the scorer 206 scores the images based at least in part on the trend.

The suggestion module 212 is software including routines for determining a set of suggested profile images. In one embodiment, the suggestion module 212 is a set of instructions executable by the processor 235 to provide the functionality described below for determining the set of suggested profile images. In another embodiment, the suggestion module 212 is stored in the memory 237 of the computing device 200 and is accessible and executable by the processor 235. In either embodiment, the suggestion module 212 is adapted for cooperation and communication with the processor 235, the storage 240, the controller 202, the user interface engine 214 and other components of the computing device 200 via signal line 230.

The suggestion module 212 receives the scored images from the scorer 206. The scorer determines an order for the set of profile images and a number of images to suggest. In one embodiment, the suggestion module 212 generates a set of profile images with the highest scored images being ordered in descending order. For example, if there are five images available with only the user tagged, the suggestion module 212 generates a set of the five suggested profile images and provides the suggested profile images to a user by instructing the user interface engine 214 to display the five suggested profile images. If there are less than five images with only the user tagged, the suggestion module 212 generates a set of five suggested profile images with both only the user being tagged and multiple people being tagged in the images. If there are less than five images available of either user-only images and multiple people images, the suggestion module 212 instructs the user interface engine 214 to display the number of images available. Persons of ordinary skill in the art will recognize that the set of five suggested profile images is one example and that other examples, such as two or 10 are possible.

In one embodiment, the suggestion module 212 incorporates profile images of objects or people that are identified by the trend analyzer 210 as being part of a trend. In one embodiment, if there are multiple trends and multiple images available, the suggestion module 212 includes a single trend in the set of suggested profile pictures to avoid overwhelming the user.

The user interface engine 214 is software including routines for generating a user interface. In one embodiment, the user interface engine 214 is a set of instructions executable by the processor 235 to provide the functionality described below for generating a user interface. In another embodiment, the user interface engine 214 is stored in the memory 237 of the computing device 200 and is accessible and executable by the processor 235. In either embodiment, the user interface engine 212 is adapted for cooperation and communication with the processor 235, the social network application 204, the suggestion module 214 and other components of the computing device 200 via signal line 232.

In one embodiment, the user interface engine 214 receives instructions from the social network application 204 and generates a user interface that displays the social network content requested by the user 125 including posts, comments, the social graph, registration information, preferences, etc. In another embodiment, the user interface engine 214 receives instructions from the suggestion module 212 and generates a user interface displaying the set of suggested profile images. Once the user interface engine 214 generates the user interface, the controller 202 transmits the user interface via the communication unit 245 to the user device 115a.

User Interface

Figure 3:
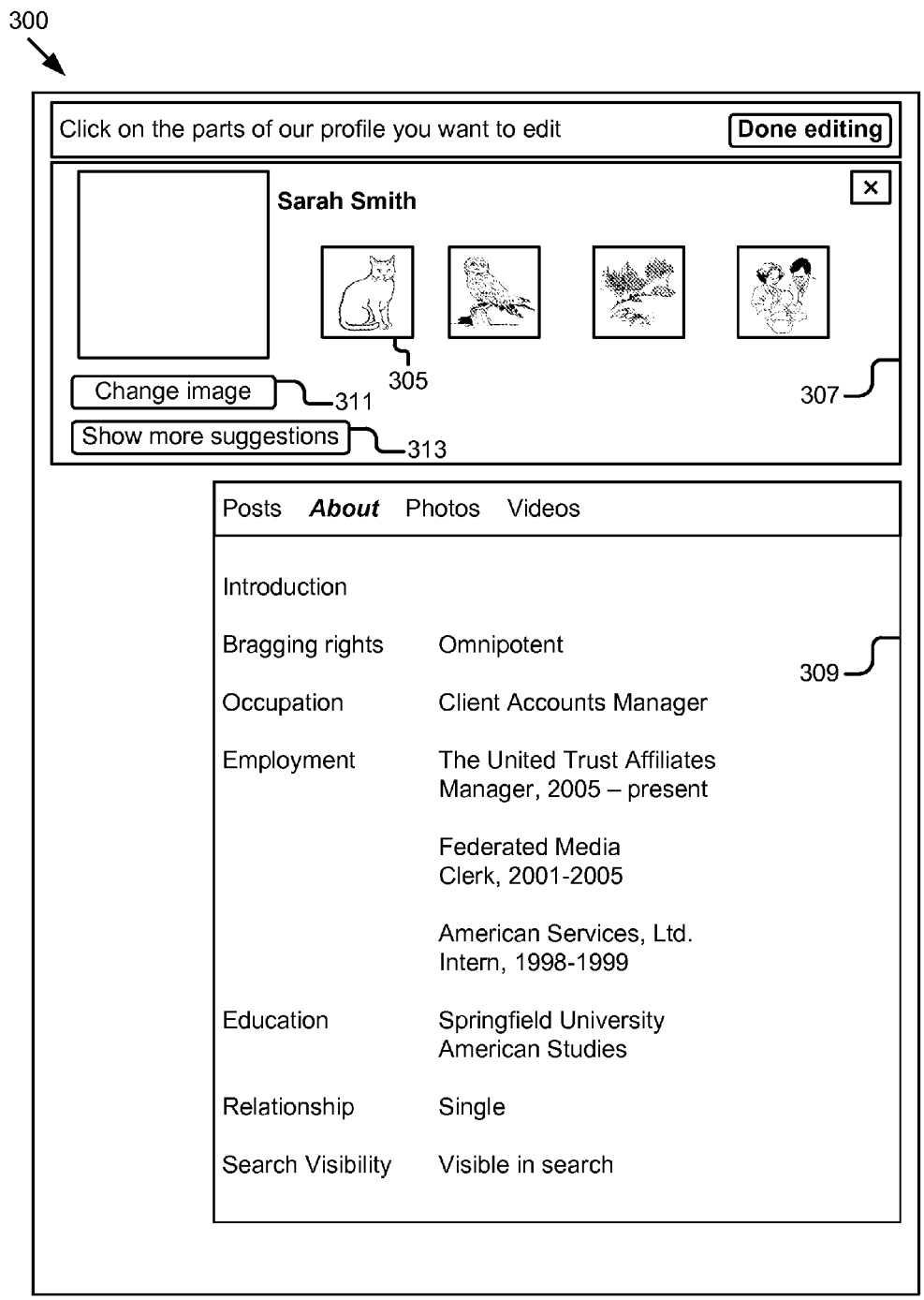
FIG. 3 is one example of a graphic representation of a user interface that displays a user profile page.

Turning now to FIG. 3, one example of a graphic representation of a user interface 300 generated by the user interface engine 212 is illustrated. The user modifies the profile by clicking on the parts of the profile that the user wants to edit. The user interface 300 includes sections of a user profile that the user can modify. These sections are divided into two areas: an image section 307 and a text section 309. The text section 309 includes information about the user, such as bragging rights, occupation and employment history. The image section 307 includes pictures uploaded by the user, such as the picture of the cat 305. The image section also includes a profile image. In this example the profile image is blank. The user changes the profile image by selecting the change image tab 311 to drag and drop and image into the user interface or select a photo from the user device's 115 storage. The user interface generates a set of suggested profile images in response to selecting the show more suggestions tab 313.

Figure 4:
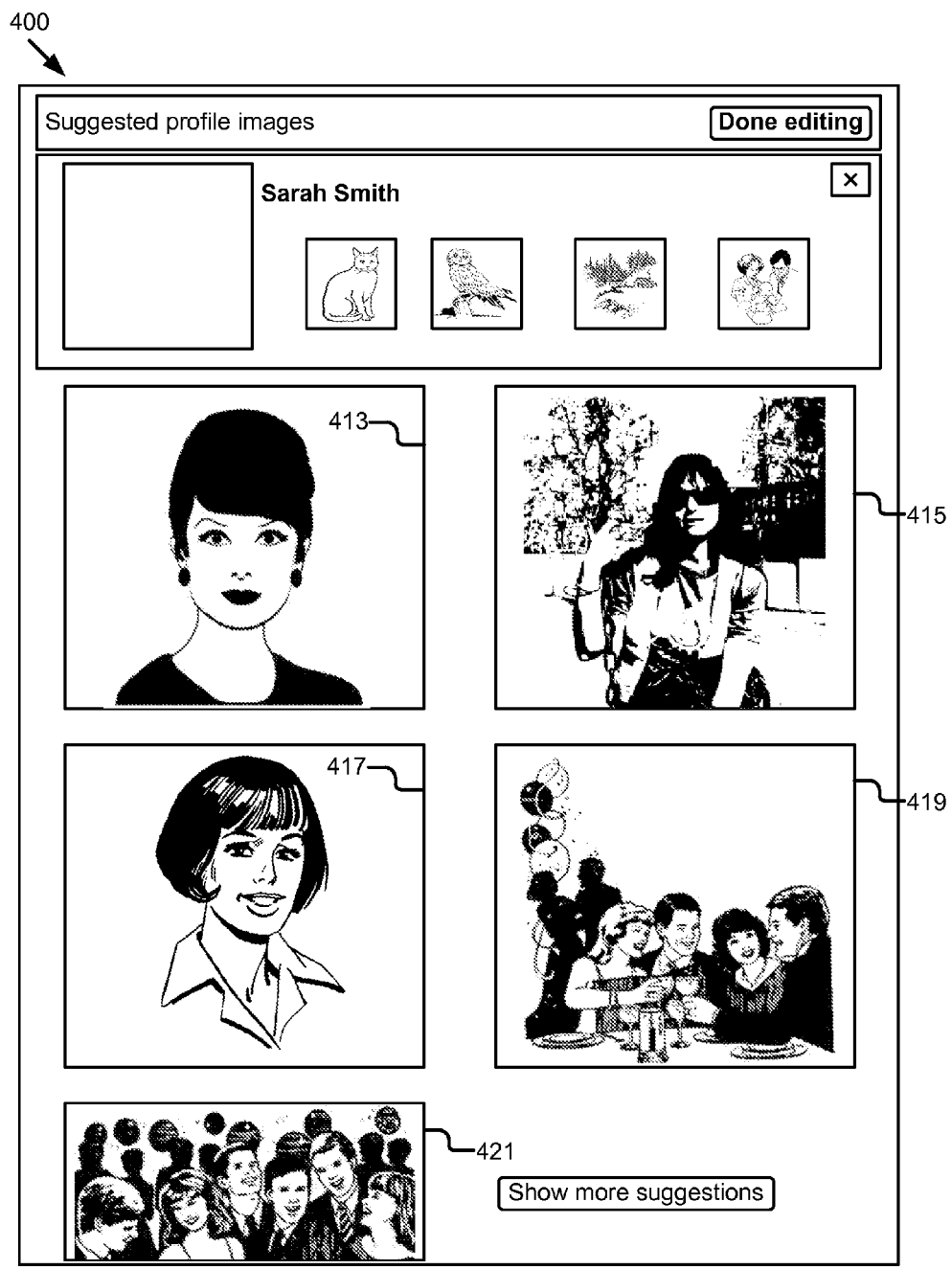
FIG. 4 is one example of a graphic representation of a user interface that displays a set of suggested profile pictures.

FIG. 4 illustrates an example of a user interface 400 that the user interface engine 214 displays in response to the user selecting the show more suggestions tab 313. If the user selects one of the images, the suggestion module 212 updates the user profile with the selected image.

In this example, the user interface engine displays five profile images 413, 415, 417, 419, 421. The first three images 413, 415, 417 are of the user. The third image 417 appears lower in the set because it is an older picture of the user. The fourth and fifth images 419, 421 include both the user and other people because the storage 240 did not include five pictures of only the user. In one embodiment, the user's identity was confirmed by the recognition engine 208.

Methods

Figure 5:
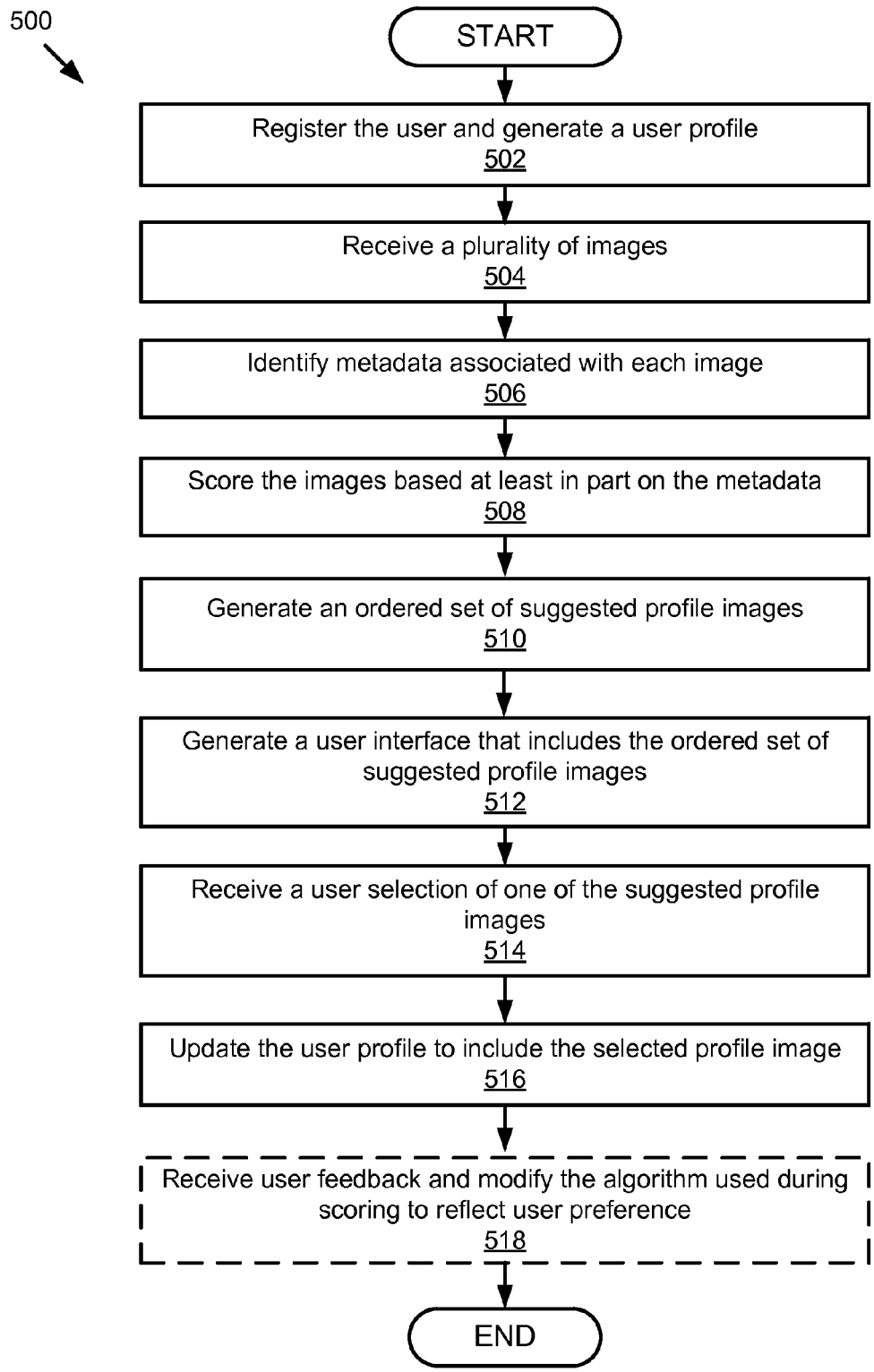
FIG. 5 is a flow diagram of one embodiment of a method for generating a set of suggested profile images.
Figure 6:
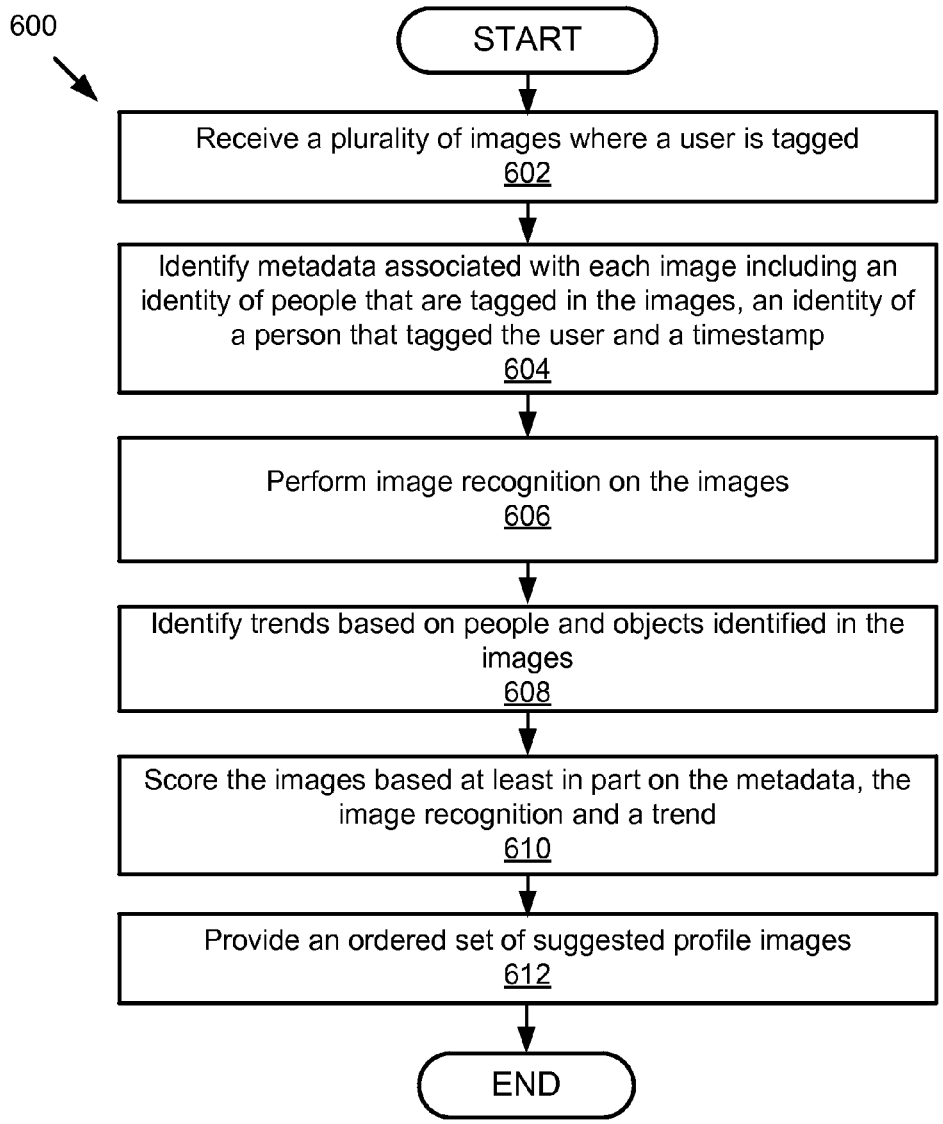
FIG. 6 is a flow diagram of another embodiment of a method for generating a set of suggested profile images.

Referring now to FIGS. 5 and 6, various embodiments of the method of the specification will be described. FIG. 5 is a flow diagram 500 of one embodiment of a method for generating a set of profile images. The social network application 204 registers 502 the user and generates a user profile. The user profile includes a username and password, the user's name, demographics, bragging rights, work history, education, etc. The user profile is stored in storage 240. The controller 202 receives 504 a plurality of images and transmits the images to the scorer 206. The scorer 206 identifies 506 metadata associated with each image. For example, the scorer 206 identifies the number of users tagged in images, the names of users tagged in images and a timestamp that the image was captured. In one embodiment, the scorer 206 also identifies a time that the image was uploaded to account for a user's preference to display a profile image from recently uploaded images, regardless of the time that the image was captured. The scorer 206 scores 508 the images based at least in part on the metadata. For example, images where only the user is tagged receives a higher score than images where the user and other people are tagged. In another example, more recent pictures receive a higher score than older images.

The scorer 206 transmits the scored images to the suggestion module 212, which generates 510 an ordered set of suggested profile images. The suggestion module 212 transmits the ordered set to the user interface engine 214 with instructions to generate 512 a user interface that includes the ordered set of suggested profile images. The controller 202 transmits the user interface to the user device 115a via communication unit 245. The user selects one of the suggested profile images and the social network application 204 receives 514 a user selection of one of the suggested profile images. The social network application 204 updates 516 the user profile to include the selected profile image. In one embodiment, the controller 202 receives 518 user feedback and transmits the user feedback to the scorer 206, which modifies the algorithm used during scoring to reflect user preference. For example, if the user consistently selects suggested profile images that include multiple people in the image, the scorer 206 modifies the algorithm to prioritize images with multiple people over images that only include the user.

FIG. 6 is a flow diagram 600 of another embodiment of a method for suggesting at least one profile image for a post. The controller 202 receives 602 a plurality of images where a user is tagged. In one embodiment, the images were uploaded to the social network and stored in storage 240. In another embodiment, the controller 202 receives images from a third-party application 118, such as a photo-sharing website. The controller 202 transmits the images to the scorer 206, which identifies 604 metadata associated with each image including an identity of people that are tagged in the images, an identity of a person that tagged the user and a timestamp of when the image was captured and when the image was uploaded to the social network.

The controller 202 also transmits the images to the recognition engine 208, which performs 606 image recognition to confirm the user's identity, identify other people in the image and identify objects. If the image contains people that were untagged, the recognition engine 208 tags those people. If the image contains an improperly tagged person, the recognition engine removes the improper tag. The recognition engine 208 transmits the results to the scorer 206 and a trend analyzer 210. The trend analyzer 210 identifies 608 trends based on people and objects identified in the images. The trend analyzer 210 transmits the trend to the scorer 206, which scores 610 user images that include the object or person. The scorer 206 transmits the score to the suggestion module 212, which provides 612 an ordered set of suggested profile images to the user. In one embodiment, the suggestion module 212 includes one image that was selected because it is part of a trend. In one embodiment, the suggestion module 212 provides the ordered set of suggested profile images to the user by instructing the user interface engine 214 to generate a user interface that includes the suggested profile images.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
   receiving a first image and a second image, the first image and the second image associated with a first user;
   identifying, with one or more processors, metadata associated with the first image and metadata associated with the second image;
   scoring, with the one or more processors, the first image based at least in part on the metadata associated with the first image and the second image based at least in part on the metadata associated with the second image by assigning different scores to the first image and the second image when the metadata associated with the first image indicates that the first user was identified from the first image by the first user and the metadata associated with the second image indicates that the first user and a second user were identified from the second image;
   generating, with the one or more processors, an ordered set of suggested profile images including the first image and the second image and an order of the ordered set of suggested profile images based at least in part on the scoring of the first image and the second image; and
   providing the ordered set of suggested profile images to the first user.

2. The method of claim 1, wherein the metadata includes at least one of a tag of the first user, a tag of other people and a timestamp.

3. The method of claim 2, wherein an image where the first user and other people are tagged is later in the order of the ordered set of suggested profile images than an image where the first user is tagged.

4. The method of claim 2, wherein a less recent image is scored such that the less recent image is later in the order of the ordered set of suggested profile images based at least in part on the timestamp.

5. The method of claim 1, wherein the first image and the second image include at least one of a user-uploaded image and an image from a third-party application.

6. The method of claim 1, further comprising:
   receiving a selected profile image from the ordered set of suggested profile images;
   updating a user profile associated with the first user to include the selected profile image, wherein receiving the selected profile image constitutes a user preference from the first user; and
   adjusting the scoring to reflect the user preference.

7. The method of claim 2, further comprising performing image recognition on the first image and the second image to determine whether the first user was properly tagged.

8. The method of claim 2, further comprising performing image recognition to determine whether one or more of the first image and the second image include a person that is not tagged.

9. The method of claim 1, further comprising:
   performing image recognition on one or more of the first image and the second image in a social network to identify at least one of a person and an object;
   identifying a trend based at least in part on the at least one of the person and the object; and
   wherein the scoring is based at least in part on the trend.

10. The method of claim 1, wherein a user profile associated with the first user lacks a profile image.

11. A system comprising:
    a scorer stored on a memory and executable by one or more processors, the scorer receiving a first image and a second image, the first image and second image associated with a first user, identifying metadata associated with the first image and metadata associated with the second image, and scoring the first image based at least in part on the metadata associated with the first image and the second image based at least in part on the metadata associated with the second image by assigning different scores to the first image and the second image when the metadata associated with the first image indicates that the first user was identified from the first image by the first user and the metadata associated with the second image indicates that the first user and a second user were identified from the second image;

a suggestion module stored on the memory and executable by the one or more processors, the suggestion module generating an ordered set of suggested profile images including the first image and the second image and an order of the ordered set of suggested profile images based at least in part on the scoring of the first image and the second image; and a user interface engine stored on the memory and executable by the one or more processors, the user interface engine providing the ordered set of suggested profile images for display to the first user.

12. The system of claim 11, wherein the metadata includes at least one of a tag of the first user, a tag of other people and a timestamp.

13. The system of claim 12, wherein the scorer generates a score for an image where the first user and other people are tagged such that the image is ordered later than an image where the first user is tagged in the ordered set of suggested profile images.

14. The system of claim 12, wherein the scorer generates a score for a less recent image such that the less recent image is later in the order of the set of suggested profile images based at least in part on the timestamp.

15. The system of claim 11, wherein the first image and the second image are at least one of a user-uploaded image and an image from a third-party application.

16. The system of claim 11, further comprising:
a social network application stored on the memory and executable by the one or more processors, the social network application receiving a selected profile image from the ordered set of suggested profile images and updating a user profile associated with the first user to include the selected profile image,
wherein receiving the selected profile constitutes a user preference, and
wherein the scorer adjusts the scoring to reflect the user preference.

17. The system of claim 12, further comprising a recognition engine coupled to the scorer, the recognition engine for performing image recognition on the first image and the second image to determine whether the first user was properly tagged.

18. The system of claim 12, further comprising a recognition engine coupled to the scorer, the recognition engine for performing image recognition to determine whether one or more of the first image and the second image include a person that is not tagged.

19. The system of claim 11, further comprising:
a recognition engine coupled to the scorer, the recognition engine for performing image recognition on the first image and the second image in a social network to identify at least one of a person and an object;
a trend analyzer coupled to the recognition engine and the scorer, the trend analyzer for identifying a trend based at least in part on the at least one of the person and the object; and
wherein the scoring is based at least in part on the trend.

20. A computer program product comprising a non-transitory computer useable medium including a computer readable program, wherein the computer readable program when executed on a computer causes the computer to:
receive a first image and a second image, the first image and the second image associated with a first user;
identify metadata associated with the first image and metadata associated with the second image;
score the first image based at least in part on the metadata associated with the first image and the second image based at least in part on the metadata associated with the second image by assigning different scores to the first image and the second image when the metadata associated with the first image indicates that the first user was identified from the first image by the first user and the metadata associated with the second image indicates that the first user and a second user were identified from the second image;
generate an ordered set of suggested profile images including the first image and the second image and an order of the ordered set of suggested profile images based at least in part on the scoring of the first image and the second image; and
generate a user interface for displaying the ordered set of suggested profile images to the first user.

* * * * *